United States Patent
Mundt et al.

(10) Patent No.: US 12,088,029 B2
(45) Date of Patent: Sep. 10, 2024

(54) CABLE TERMINATION FOR INFORMATION HANDLING SYSTEMS

(71) Applicant: Dell Products L.P., Round Rock, TX (US)

(72) Inventors: Kevin Warren Mundt, Austin, TX (US); Bhyrav Murthy Mutnury, Austin, TX (US); Sandor Farkas, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 531 days.

(21) Appl. No.: 17/443,046

(22) Filed: Jul. 20, 2021

(65) Prior Publication Data

US 2023/0028514 A1     Jan. 26, 2023

(51) Int. Cl.
| | |
|---|---|
| H01R 13/02 | (2006.01) |
| H01B 11/00 | (2006.01) |
| H01B 13/00 | (2006.01) |
| H02G 1/12 | (2006.01) |

(52) U.S. Cl.
CPC ......... *H01R 13/025* (2013.01); *H01B 11/002* (2013.01); *H01B 13/0006* (2013.01); *H01B 13/0016* (2013.01); *H01B 13/003* (2013.01); *H02G 1/128* (2013.01); *H01R 2201/04* (2013.01)

(58) Field of Classification Search
CPC .............. H01B 11/002; H01B 13/0006; H01B 13/0016; H01B 13/003; H01R 12/62; H01R 13/6474; H01R 13/025; H01R 4/023; H01R 43/28; H02G 1/128; H02G 1/005

See application file for complete search history.

(56) References Cited

U.S. PATENT DOCUMENTS

| | | | | |
|---|---|---|---|---|
| 1,713,970 | A * | 5/1929 | Lowry ............... | A61B 18/1402 606/45 |
| 2,297,785 | A * | 10/1942 | Lake ........................ | H01R 4/20 439/866 |
| 2,513,590 | A * | 7/1950 | Seifert ..................... | B60M 5/00 238/14.13 |
| 3,125,835 | A * | 3/1964 | Crowl et al. ......... | H02G 1/1265 407/53 |
| 3,309,634 | A * | 3/1967 | Wheeler ................. | H01P 1/222 333/81 R |
| 3,659,332 | A * | 5/1972 | Morrone ................ | H02G 1/128 134/1 |
| 3,760,348 | A * | 9/1973 | Kieser ................... | B06B 1/0648 367/157 |

(Continued)

*Primary Examiner* — Timothy J Thompson
*Assistant Examiner* — Rhadames Alonzo Miller
(74) *Attorney, Agent, or Firm* — Norton Rose Fulbright US LLP (57) ABSTRACT

A cable such as a server cable may have a tapered termination portion that when connected to other information handling system components reduces the loss of signal between the cable and the information handling system component. A method of making a cable with a tapered termination portion comprising heating a wire having an end and a body portion, the body portion having a first diameter; pulling the end relative to the body portion, for example with a clamp coupled to the end under tension, to obtain a location between the end and the body portion having a second diameter smaller than the first diameter; and cutting the wire at the location.

11 Claims, 7 Drawing Sheets

(56) References Cited

U.S. PATENT DOCUMENTS

| | | | | |
|---|---|---|---|---|
| 4,671,848 A * | 6/1987 | Miller | H02G 1/128 | 219/121.85 |
| 4,718,860 A * | 1/1988 | Gobets | H01R 12/772 | 439/494 |
| 4,842,544 A * | 6/1989 | Birch | H01R 9/053 | 439/930 |
| 4,871,318 A * | 10/1989 | Gobets | H01R 12/62 | 439/604 |
| 4,931,616 A * | 6/1990 | Usui | B23K 26/0732 | 219/121.68 |
| 4,966,565 A * | 10/1990 | Dohi | H01R 4/187 | 29/860 |
| 5,201,903 A * | 4/1993 | Corbett, III | H01R 13/50 | 607/57 |
| 5,321,227 A * | 6/1994 | Fuchs | B23K 26/0738 | 219/121.73 |
| 5,378,857 A * | 1/1995 | Swailes | H05K 1/111 | 174/251 |
| 5,424,693 A * | 6/1995 | Lin | H01L 23/66 | 333/33 |
| 5,451,737 A * | 9/1995 | Bertholds | B23H 7/04 | 219/69.12 |
| 5,762,521 A * | 6/1998 | Tanaka | H01R 12/777 | 439/492 |
| 5,837,961 A * | 11/1998 | Miller | B23K 26/067 | 219/121.79 |
| 6,022,369 A * | 2/2000 | Jacobsen | A61B 17/1214 | 606/1 |
| 6,212,766 B1 * | 4/2001 | Ohsumi | H01R 43/20 | 29/748 |
| 6,265,664 B1 * | 7/2001 | Sakaguchi | H01R 4/18 | 174/78 |
| 6,346,091 B1 * | 2/2002 | Jacobsen | A61B 17/12172 | 604/93.01 |
| 6,727,579 B1 * | 4/2004 | Eldridge | H01L 24/72 | 257/E23.024 |
| 7,453,345 B2 * | 11/2008 | Bednarek | H01H 85/143 | 337/194 |
| 8,043,364 B2 * | 10/2011 | Lombardi | A61L 31/022 | 623/1.36 |
| 8,543,222 B1 * | 9/2013 | Sochor | A61B 90/11 | 607/116 |
| 9,992,861 B2 * | 6/2018 | Middendorf | H05K 1/0271 | |
| 9,994,945 B2 * | 6/2018 | Yoshida | C22F 1/043 | |
| 10,254,499 B1 * | 4/2019 | Cohen | B29C 64/321 | |
| 10,294,547 B2 * | 5/2019 | Ito | H01R 13/03 | |
| 2001/0020546 A1 * | 9/2001 | Eldridge | G01R 1/07378 | 257/E21.507 |
| 2002/0017299 A1 * | 2/2002 | Hickle | A61B 5/4821 | 128/205.25 |
| 2002/0062091 A1 * | 5/2002 | Jacobsen | A61M 25/09 | 600/585 |
| 2002/0144984 A1 * | 10/2002 | Mori | B23K 26/244 | 219/121.64 |
| 2003/0226837 A1 * | 12/2003 | Blake | A24F 40/50 | 219/535 |
| 2005/0050713 A1 * | 3/2005 | Locher | H02G 1/005 | 29/564.4 |
| 2005/0112861 A1 * | 5/2005 | Fitzsimmons | H01L 24/85 | 257/E23.02 |
| 2006/0138091 A1 * | 6/2006 | Lee | C23C 2/28 | 219/69.12 |
| 2008/0228085 A1 * | 9/2008 | Jenkins | A61B 1/0008 | 600/478 |
| 2008/0312597 A1 * | 12/2008 | Uihlein | A61M 25/09 | 604/164.13 |
| 2009/0216910 A1 * | 8/2009 | Duchesneau | H01B 3/24 | 709/250 |
| 2010/0126665 A1 * | 5/2010 | Cale | B23K 26/0846 | 156/701 |
| 2010/0174246 A1 * | 7/2010 | Bunch | A61M 25/09 | 604/526 |
| 2010/0270275 A1 * | 10/2010 | Nakamae | B23K 26/009 | 219/121.64 |
| 2011/0062218 A1 * | 3/2011 | Ohnuma | B23K 20/106 | 228/110.1 |
| 2011/0209900 A1 * | 9/2011 | Roath | H01R 13/65915 | 174/250 |
| 2012/0191003 A1 * | 7/2012 | Garabedian | A61N 1/0551 | 600/554 |
| 2012/0321889 A1 * | 12/2012 | Sekiya | C22F 1/00 | 428/372 |
| 2013/0126055 A1 * | 5/2013 | Sekiya | H01B 13/0006 | 148/439 |
| 2013/0220673 A1 * | 8/2013 | Middendorf | H05K 3/32 | 174/250 |
| 2013/0230755 A1 * | 9/2013 | Dimmock | H01M 50/211 | 174/254 |
| 2013/0233586 A1 * | 9/2013 | Park | H01B 13/0006 | 174/128.1 |
| 2013/0240385 A1 * | 9/2013 | Loehrke | H01M 50/24 | 206/703 |
| 2014/0033875 A1 * | 2/2014 | Nakamura | H02G 1/1204 | 81/9.4 |
| 2014/0103029 A1 * | 4/2014 | Maryniak | H02G 1/128 | 81/9.4 |
| 2014/0205492 A1 * | 7/2014 | Inoue | H01B 13/0006 | 164/76.1 |
| 2014/0212703 A1 * | 7/2014 | Kobori | H01M 4/583 | 252/182.1 |
| 2014/0249601 A1 * | 9/2014 | Bachinski | A61N 1/37247 | 607/59 |
| 2014/0311797 A1 * | 10/2014 | Numata | H02G 15/06 | 174/75 R |
| 2014/0316630 A1 * | 10/2014 | Kohlberger | B60L 53/11 | 701/22 |
| 2014/0353002 A1 * | 12/2014 | Placke | H01B 13/0006 | 427/117 |
| 2015/0011126 A1 * | 1/2015 | Zhou | H01R 13/646 | 439/620.21 |
| 2015/0074995 A1 * | 3/2015 | Patil | A61B 5/02007 | 29/854 |
| 2015/0162729 A1 * | 6/2015 | Reversat | H02G 1/128 | 219/121.73 |
| 2015/0229088 A1 * | 8/2015 | Johnson | B23K 3/08 | 901/42 |
| 2015/0320116 A1 * | 11/2015 | Bleloch | A24F 40/44 | 219/628 |
| 2015/0375339 A1 * | 12/2015 | Sterling | B23K 35/0272 | 219/121.72 |
| 2016/0027559 A1 * | 1/2016 | Masui | H01B 13/0006 | 29/868 |
| 2016/0303353 A1 * | 10/2016 | Simpson | A61M 25/09 | |
| 2017/0013879 A1 * | 1/2017 | Frisbee | A24F 40/40 | |
| 2017/0175657 A1 * | 6/2017 | Fei | F02D 41/0025 | |
| 2017/0200534 A1 * | 7/2017 | Milke | H01L 24/43 | |
| 2017/0207499 A1 * | 7/2017 | Leadley | H02J 7/00304 | |
| 2017/0250552 A1 * | 8/2017 | Liu | H01M 10/46 | |
| 2017/0251718 A1 * | 9/2017 | Armoush | A24F 40/40 | |
| 2018/0001418 A1 * | 1/2018 | Evans | B23K 26/364 | |
| 2018/0093078 A1 * | 4/2018 | Patil | A61B 5/027 | |
| 2018/0179106 A1 * | 6/2018 | Schowengerdt | G02B 6/02 | |
| 2018/0256200 A1 * | 9/2018 | Benning | A61B 17/3417 | |
| 2018/0278032 A1 * | 9/2018 | Ben-Ron | B23K 26/351 | |
| 2019/0020012 A1 * | 1/2019 | Ju | H01R 12/59 | |
| 2019/0039180 A1 * | 2/2019 | Sterling | B23K 26/21 | |
| 2019/0151995 A1 * | 5/2019 | Evans | B23K 26/127 | |
| 2019/0329006 A1 * | 10/2019 | Watanabe | A61M 25/09 | |
| 2019/0335577 A1 * | 10/2019 | Götz | H05K 7/209 | |
| 2020/0112148 A1 * | 4/2020 | Peterson | H01R 43/16 | |
| 2020/0161824 A1 * | 5/2020 | Duncan | H02G 1/128 | |
| 2020/0171295 A1 * | 6/2020 | Beach | A61M 25/0169 | |
| 2021/0060310 A1 * | 3/2021 | Kim | A61M 25/09041 | |
| 2021/0128181 A1 * | 5/2021 | Hayzelden | A61B 17/22 | |
| 2021/0128872 A1 * | 5/2021 | Kalhor | A61M 25/09 | |
| 2021/0128874 A1 * | 5/2021 | Rodriguez | A61M 25/0113 | |
| 2021/0128883 A1 * | 5/2021 | Gill | A61M 25/09 | |
| 2021/0128884 A1 * | 5/2021 | Hayzelden | A61M 25/09 | |
| 2021/0194226 A1 * | 6/2021 | Ben-Ron | H02G 1/1297 | |

(56) References Cited

U.S. PATENT DOCUMENTS

| | | | |
|---|---|---|---|
| 2021/0257758 A1* | 8/2021 | Di Stefano | H01L 24/73 |
| 2021/0299402 A1* | 9/2021 | Sakamoto | A61M 25/0052 |
| 2021/0339341 A1* | 11/2021 | Schuster | B23K 26/70 |
| 2022/0140580 A1* | 5/2022 | Gebert | H01B 1/02 |
| | | | 219/121.72 |
| 2022/0168090 A1* | 6/2022 | Shirahama | A61F 2/2476 |
| 2022/0193816 A1* | 6/2022 | Unger | B23K 20/007 |
| 2022/0294196 A1* | 9/2022 | Gebert | B23K 26/36 |
| 2022/0393445 A1* | 12/2022 | Rebel | H02G 1/128 |
| 2023/0006521 A1* | 1/2023 | Ushida | H02K 3/34 |
| 2023/0071592 A1* | 3/2023 | Suwa | H05K 3/4038 |

* cited by examiner

CABLE TERMINATION FOR INFORMATION HANDLING SYSTEMS

FIELD OF THE DISCLOSURE

The instant disclosure relates to information handling systems. More specifically, portions of this disclosure relate to cable termination within and between information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Within the field of information handling systems, there is an ever-increasing demand for high-speed communication of information within an information handling system and between information handling systems. For example, high speed cables are a critical component of servers and other information handling systems. High speed cables can be flexibly configured, implement 3D connections, and provide a low loss medium for signal transmission. However, some of the signal transmission may be lost at the portions(s) where the cable terminates and connects to another component of an information handling system such as a circuit board or connector. Such connection may be made by coupling (e.g., soldering) the termination portion of a cable to a pad or pin of an information handling system component. The loss of signal quality is largely due to the difference in capacitance and inductance between the termination portion of the cable and the pad or pin, which results in a difference in impedance. This difference causes some of the transmitted signal to be reflected back through the cable at the connection point, which reduces signal quality. The loss of signal quality increases (and will continue to increase) as signal transmission speeds increase, for example, with each server generation.

One way to mitigate the signal loss at the termination portion is by using smaller diameter wire throughout the cables. However, smaller diameter wire creates more signal loss than larger diameter wire as the signal passes along its length, so any improvement in signal integrity at the connection point would be offset by a greater signal loss during transmission to the connection. Another way to address the signal loss at the termination portion is by using a complex configuration of voids and shields around the bonding site to reduce an impedance drop between the cable and bonding site. However, in addition to being complicated, time consuming and difficult, this technique can cause other signal issues such as crosstalk (e.g., where a void allows a portion of a signal to be transmitted to an unintended conductor).

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

As described more fully in this disclosure, a cable such as a server cable may have a wire with a tapered termination portion that reduces the loss of signal between the wire and the information handling system component. The tapered termination portion may allow a gradual change of impedance between the wire and its end and the connection point (referred to herein as a "bonding site") of the information handling system component. The tapering results in a smaller wire end, which may also permit the bonding site to be smaller, requiring less time and resources to form a connection. For example, a conventional cable termination portion is the same diameter as the majority of the wire carrying the signal transmission through the cable. This diameter may be relatively large (e.g., 28-34 aluminum or copper gauge wire) to prevent loss of signal along the cable because larger diameter wires have less loss than smaller diameter wires. A large diameter wire, such as that of a server cable, requires an appropriately sized (i.e., large) bonding site such as a large soldering pad or pin. Coupling a relatively large diameter cable wire to a relatively large bonding site requires a relatively large amount of resources. In contrast, the end of the tapered termination portion disclosed herein is of a relatively small diameter (e.g., less than or equal to 50% of the diameter of the majority of the cable wire) and therefore may be coupled to a relatively small bonding site requiring a relatively small amount of time and resources. In addition, the reduced diameter at the end of the termination portion will generate less signal loss than a conventional cable termination portion connection as the signal passes from the cable through the bonding site to its information handling system component. The tapered nature of the termination portion at its end also reduces signal loss, creating a transition for the signal between the majority of the wire and the end of the wire and bonding site. As the diameter of the wire gradually narrows along the termination portion, the impedance increase also gradually occurs so that little of the signal is reflected back through the wire, and signal integrity is maintained.

According to an embodiment of the disclosure, a system comprises a bonding site, such as (e.g., solder) pad or pin connections, configured to electrically couple a first electronic device to a second electronic device. For example, the bonding site may be configured to electrically couple to electronic circuitry, e.g., through conductors extending from the bonding site to the electrical device, such as in a trace of a printed circuit board. The bonding site may integral with the first or second electronic device or a separate component. A wire, such as a copper or aluminum wire, may have an end coupled to the bonding site and cylindrical portion that represents the majority of the wire. The first end of the wire may have a smaller diameter than the cylindrical portion, for example to reduce the impedance difference between the wire and the bonding site. The diameter of the end may be significantly less than the diameter of the cylindrical portion, for example, less than or equal to 50% of the diameter of the cylindrical portion.

In some embodiments, the wire may have a location between the end and the cylindrical portion and the wire may be tapered between the end and the location. The location may have a larger diameter than the end, including a diameter substantially equivalent to the diameter at the cylindrical portion. The taper may, for example, transition between the diameter at the location (e.g., the diameter of the cylindrical portion) and the diameter at the end to provide a gradual change of impedance between the location and the end to prevent (e.g., substantial) signal loss. For example, the capacitance of the wire may gradually decrease from the location to the end.

In some embodiments, the bonding site has a size corresponding to the diameter of the end and/or is large enough to be fixedly soldered to the end of the wire but not large enough to be fixedly soldered to the cylindrical portion of the wire. For example, the bonding site may be a relative small solder pad configured to accommodate soldering of the end but may not be able or configured to accommodate the larger diameter cylindrical portion or location. In some embodiments, there is a cable comprising the insulation and the wire and the insulation encases (e.g., axially) a portion of the wire but not the portion of the wire between the location and the end such that this termination portion may be coupled to, for example, a binding site, to transmit an electronic signal. In some embodiments, the cable is a twin ax cable or other type of cable. In some embodiments, the insulation (and/or a shield) may be cut off from the cable using a relatively low power laser such as a $CO_2$ laser, for example that cannot reasonably cut through the wire.

Some embodiments of the disclosure include a method, for example of making a wire with a tapered termination portion, comprising heating a wire having a an end and a body, the body having a first diameter; pulling the end relative to the body to obtain a location between the end and the body having a second diameter smaller than the first diameter (for example, the location could be created at the midpoint of a profile created by pulling the end relative to the body while or after heating the wire); and cutting the wire at the location to separate the end from the body. In some embodiments, insulation from the wire may be cut off (e.g., prior to heating the wire) to expose the end of the wire using, for example, a first laser (such as low power laser like a $CO_2$ laser). In some embodiments, the wire may be cut using a second (e.g. more powerful) laser. In some embodiments, the end may be pulled relative to the body until the second diameter is less than or equal to 50% of the first diameter. In some embodiments, the end may be pulled relative to the body with a clamp coupled under tension to at least the end, though the clamp (or a second clamp) may also be coupled to a portion of the body to, for example, fix the axial position of the body relative to the end. In some embodiments, the clamp may pull the end relative to the body while the wire is heated. In some embodiments, the wire may be heated with electrical current prior to or while pulling the end relative to the body. For example, the current may be run through the clamps on either side of the location and across the location and a clamp coupled to the body may protect any cable insulation adjacent to the body from becoming damaged due to the current and/or heat. In some embodiments, the electrical current may be alternating or direct current. In some embodiments, the wire may be heated with a, for example broadly-focused, YAG laser. In some embodiments, a, for example tightly-focused, YAG laser may be used to the cut the wire at the location. In some embodiments the YAG laser used to heat the wire is also used to cut the wire.

In some embodiments, the method includes ceasing to pull the end relative to the body when the distance between the end and body reaches a predetermined amount using, for example, a backstop for the clamp. For example, a barrier may be placed a predetermined location behind the clamp so that the clamp cannot continue to pull the first end relative to the second end when it reaches the barrier. The predetermined distance may be a distance at which the location is at a midpoint of a profile created between the end and the body and is of desired and sufficiently small diameter (e.g., 50% or less of the diameter of the wire body).

Some embodiments include an information handling system comprising a first and second electronic device and cable. The electronic devices may each have a bonding site and the cable may be configured to electrically connect the first and second electronic devices, for example at the bonding sites. The cable may have multiple wires, each with tapered ends and the tapered ends may be configured to be electrically coupled to one of the bonding sites of the first or second electronic device. In some embodiments, one or more of the bonding sites may have a size configured to correspond to the diameter of a coupled end.

As used herein, the term "coupled" means connected, although not necessarily directly, and not necessarily mechanically; two items that are "coupled" may be unitary with each other. When referring to coupling to an "end" of a component, this includes coupling to an "end portion" of the component. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings. Elements within each FIGURE are generally drawn to scale relative to other elements in the same FIGURE.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
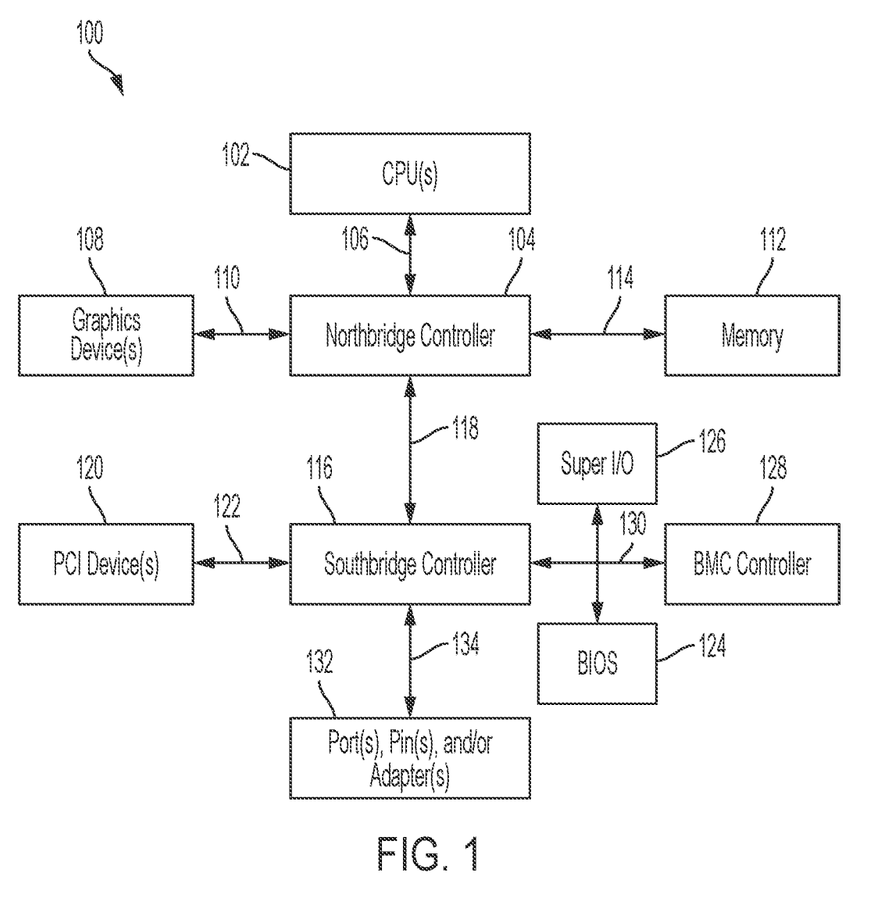
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

IHS 100 may be configured to access different types of computer-accessible media separate from memory 112. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 100 through various interfaces, such as universal serial bus (USB) interfaces, via northbridge controller 104 and/or southbridge controller 116. Some such mediums may be coupled to the IHS through a Super I/O Controller 126 combines interfaces for a variety of lower bandwidth or low data rate devices. Those devices may include, for example, floppy disks, parallel ports, keyboard and mouse and other user input devices, temperature sensors, and/or fan speed monitoring.

BIOS 124 may include non-volatile memory having program instructions stored thereon. The instructions stored on the BIOS 124 may be usable by CPU(s) 102 to initialize and test other hardware components. The BIOS 124 may further include instructions to load an Operating System (OS) for execution by CPU(s) 102 to provide a user interface for the IHS 100, with such loading occurring during a pre-boot stage. In some embodiments, firmware execution facilitated by the BIOS 124 may include execution of program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and/or manage BMC controller 128. Further, the BMC controller 128 may allow a user to setup configuration options, resolve and administer hardware or software problems, etc. Additionally or alternatively, BMC controller 128 may include one or more firmware volumes, each volume having one or more firmware files used by the BIOS firmware interface to initialize and test components of IHS 100.

One or more of the devices or components shown in FIG. 1 may be absent, or one or more other components may be added. Further, in some embodiments, components may be combined onto a shared circuit board and/or implemented as a single integrated circuit (IC) with a shared semiconductor substrate. For example, northbridge controller 104 may be combined with southbridge controller 116, and/or be at least partially incorporated into CPU(s) 102. Accordingly, systems and methods described herein may be implemented or executed with other computer system configurations. In some cases, various elements shown in FIG. 1 may be mounted on a motherboard and enclosed within a chassis of the IHS 100.

Figure 2A:
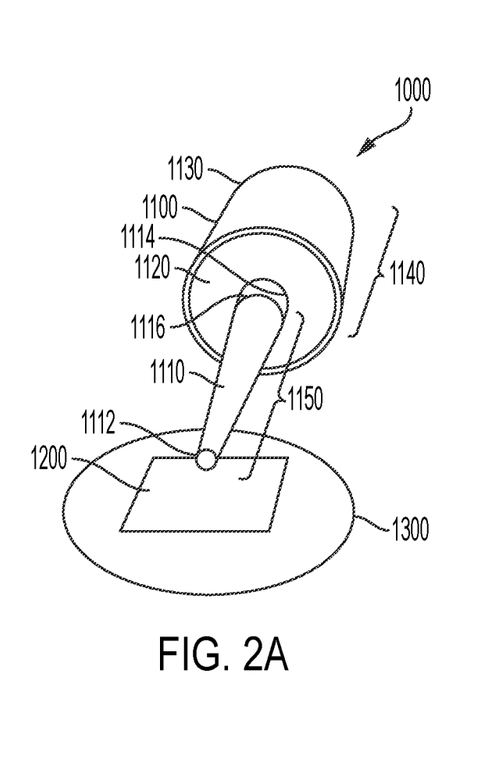
FIG. 2A is a perspective views of a cable termination connection configuration for an information handling system according to some embodiments of the disclosure

Some of the various components of an information handling system, such as IHS 100, may be connected with cables that can transmit signals (e.g., electronic information) between the components. Additionally or alternatively, components of an information handling system may be connected to components of a different information handling system by such cables. FIG. 2A depicts a configuration of a cable connection 1000 according to some embodiments of the disclosure. A cable 1100 is connected at its termination portion 1150 to a bonding site of an information handling system 1300, which is depicted as solder pad 1200. Cable 1100 includes a wire 1110 (e.g., 28-34 gauge aluminum or copper wire) that is axially bounded by insulation 1120 and a shield 1130, which together protect the wire from the environment. Insulation 1120 and shield 1130 are not included at (e.g., removed from) cable termination portion 1150 to, for example, allow for connection of cable termination portion 1150 with solder pad 1200. The connection is made at end 1112 of wire 1110. As shown in FIG. 2A, the diameter of end 1112 is less than the diameter of the wire 1110 at point 1114 (i.e., that is not part of termination portion 1150). Point 1114 represents the diameter of the majority or body or cylindrical portion 1140 of wire 1110 (which extends into the page and is not shown for clarity). The diameter of wire 1110 at end 1112 may be less than or equal to 75%, 60%, 50%, 40%, 30%, 20% or 10% of the diameter of wire 1110 at point 1114. The diameter of wire 1110 begins transitioning gradually smaller at location 1116 via a taper until it reaches the diameter at end 1112. This gradual decrease in diameter reduces signal loss along termination portion 1150, creating a transition for the signal between location 1116 and end 1112 and bonding site 1200. As the diameter of the wire gradually narrows along termination portion 1150, the impedance increase or change also gradually occurs so that little of the signal is reflected back through wire 1110 and signal integrity is maintained, such as by reducing capacitance at the bonding site. For example, the decrease in diameter size may result in a slope along the wire that is no more than 10 degrees, 15 degrees, 20 degrees, 25 degrees, 30 degrees, 40 degrees, or 50 degrees.

The relatively small diameter of end 1112 (relative to, for example, the diameter at point 1114) allows solder pad 1200 to also be relatively small so that end 1112 can be adequately fixed (i.e., fixedly soldered) to information handling system component 1300 via solder pad 1200 and provide a secure electrical connection. Solder pad 1200 has a relatively similar impedance to the impedance of end 1112 (e.g., relative to the difference in impedance between solder pad 1200 and point 1114), such that there is a relatively low impedance drop or change when a signal is passed from end 1112 to solder pad 1200 (e.g., around only 5 ohms for a conventional 30 AWG wire when measured with a 10 picosecond rise time). This relatively small impedance change results in little reflection of the signal back through wire 1110 (i.e., little loss of signal). The bonding site (e.g., solder pad 1200) has a size corresponding to the end 1112, or more generally the tapered portion 1150, which is smaller than the bonding site would be for coupling to a size corresponding to a diameter of the cylindrical portion of wire 1110. That is, the tapering allows for smaller bonding sites, which allows for higher density of connections and reduced size of electronic devices incorporating those bonding sites. The tapering of the wire 1110 provides improved electrical characteristics compared to using smaller diameter wire for wire 1110. Embodiments of the disclosure thus allow obtaining smaller contacts at bonding sites such as possible with smaller diameter wires, while providing the better electrical characteristics of larger diameter wires.

Figure 2B:
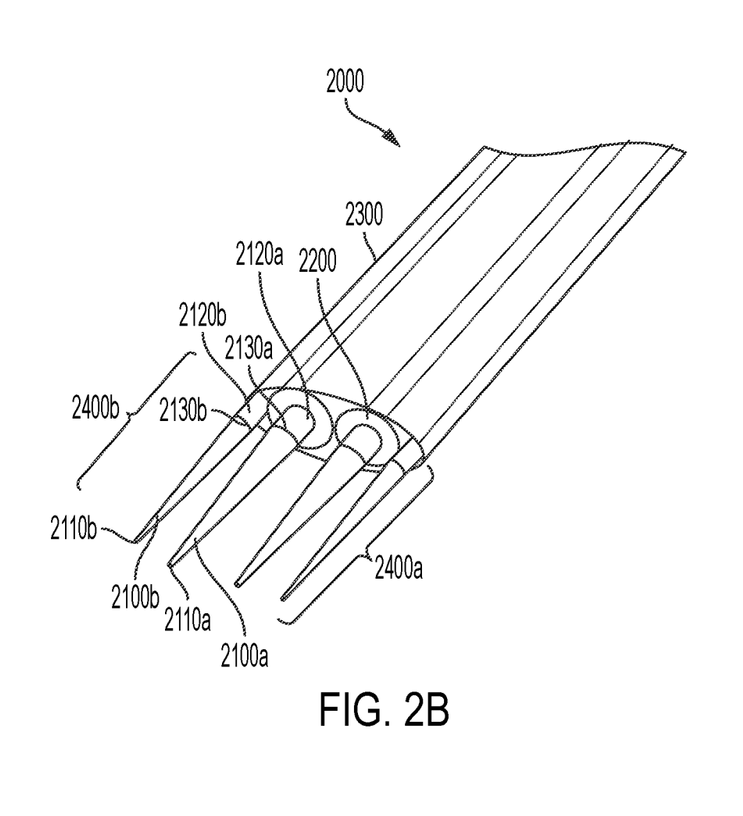
FIG. 2B is a perspective view of a cable termination configuration according to some embodiments of the disclosure.
Figure 4A:
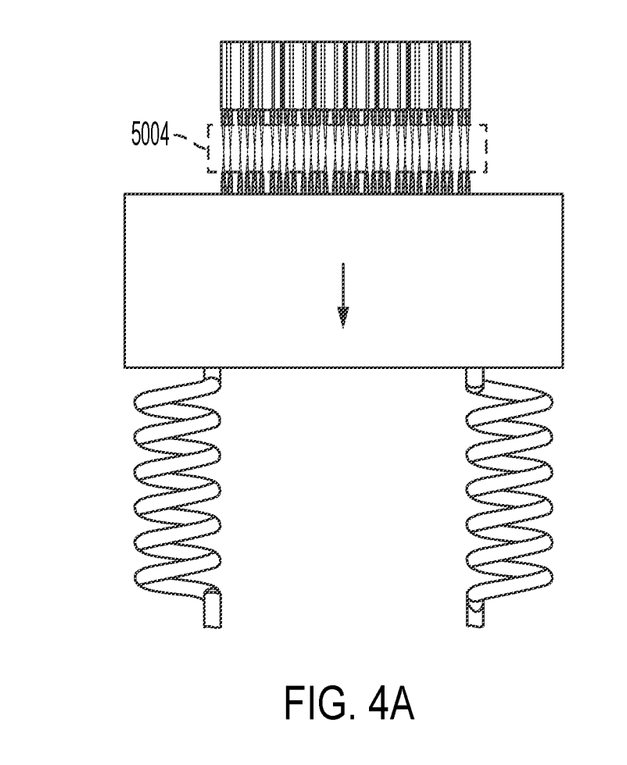
FIGS. 4A and 4B are top perspective views depicting steps of forming a wire termination portion according to some embodiments of the method illustrated in FIG. 3A.

Multiple wires like wire 1110 may be employed in a "twin-ax" cable 2000 as shown in FIG. 2B, which may be further combined into a ribbon (as shown in FIG. 4) for, for example, ease of handling. Cable 2000 includes two high speed wires 2100a and two drain or ground wires 2100b. High speed wires 2100a are each axially bounded by insulation 2200. Drain wires 2100b are intended to carry electricity to ground and therefore do not require or include insulation. Each of wires 2100a and 2100b are axially bounded by shield 2300 (to, for example, protect them from the environment) and have ends 2110*a*, 2110*b*, respectively, on cable termination portions 2400*a*, 2400*b*, respectively, for connecting wires 2100*a* and 2100*b* to a bonding site, such as a solder pad or pin, of an information handling system component. Terminations portions 2400*a*, 2400*b* are tapered from a larger diameter location 2130*a*, 2130*b*, respectively, to smaller diameter ends 2110*a*, 2110*b*, respectively. The diameter of wires 2100*a*, 2100*b* at points 2120*a*, 2120*b*, respectively (which is the diameter of the cylindrical portion or majority of wires 2100*a*, 2100*b* along their lengths) is substantially equivalent to the diameter of wires 2100*a*, 2100*b* at locations 2130*a*, 2130*b*, respectively, such that the diameter at ends 2110*a*, 2110*b* is smaller than the diameter at points 2120*a*, 2120*b*, respectively (e.g., less than or equal to 75%, 60%, 50%, 40%, 30%, or 20% of the diameter at those points, respectively).

Figure 6:
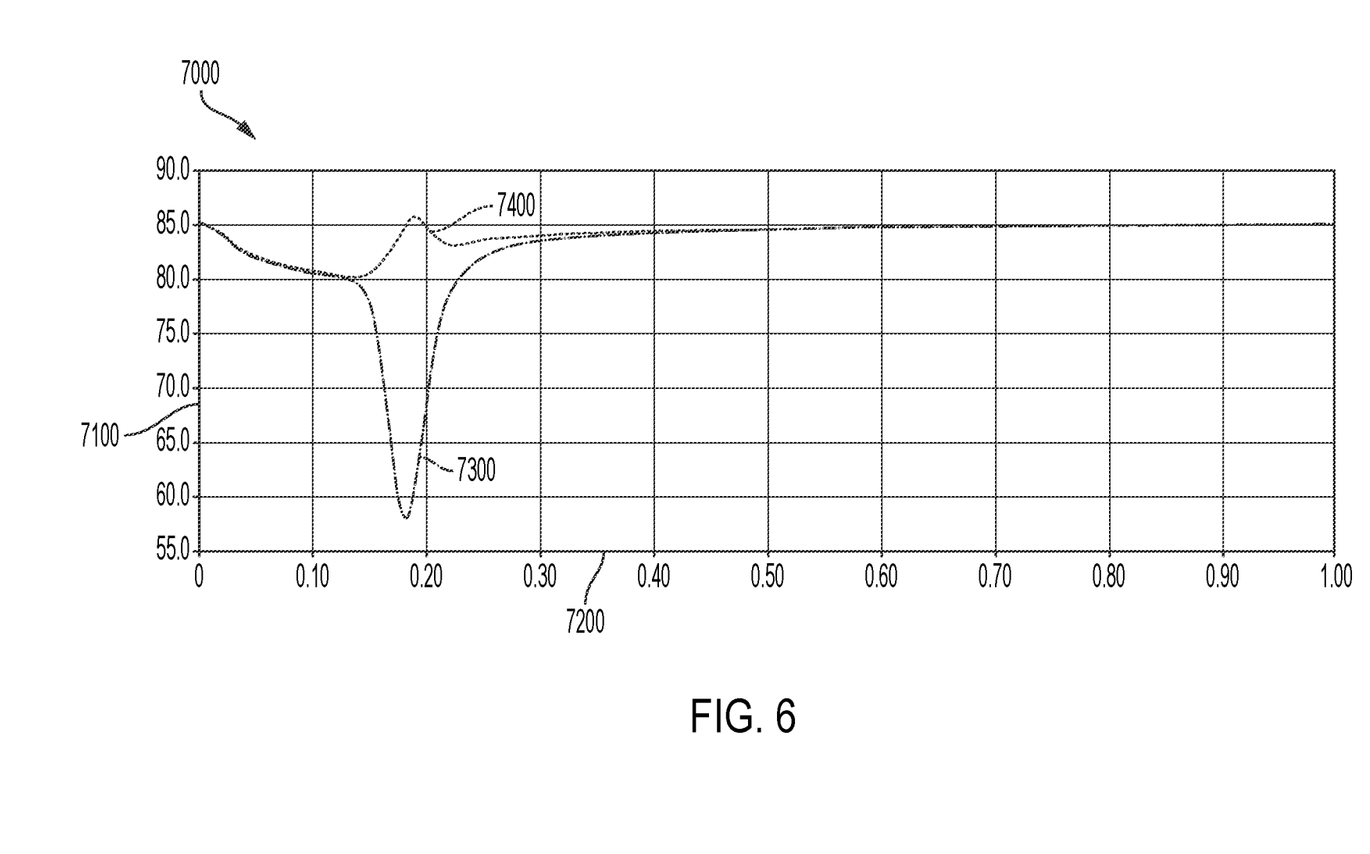
FIG. 6 is a graph of the comparison of impedance drop produced by a prior art configuration of a cable connection and a configuration of the cable connection according to some embodiments of the disclosure.

The loss of signal between cable connections is substantially reduced by the embodiments described herein. FIG. 6 depicts a time-domain reflectometer (TDR) graph 7000 comparing, with a ten picosecond rise time, (i) the impedance drop 7300 produced by a conventional cable connection configuration using a 30 AWG wire with (ii) the impedance drop 7400 produced by a cable connection configuration according to embodiments disclosed herein (e.g., configuration 1000 shown in FIG. 2A) using a 30 AWG wire. Impedance (in ohms) is shown on the Y-axis 7100 relative to time (in picoseconds) shown on the X-axis 7200. As can be seen, the impedance drop 7300 is around 27 ohms while the impedance drop 7400 is significantly less, around 5 ohms. Because impedance drop is directly related to the loss of signal, FIG. 6 demonstrates that the signal loss produced by a cable connection configuration like configuration 1000 is significantly less than the signal loss produced by conventional cable connection configuration.

Figure 3A:
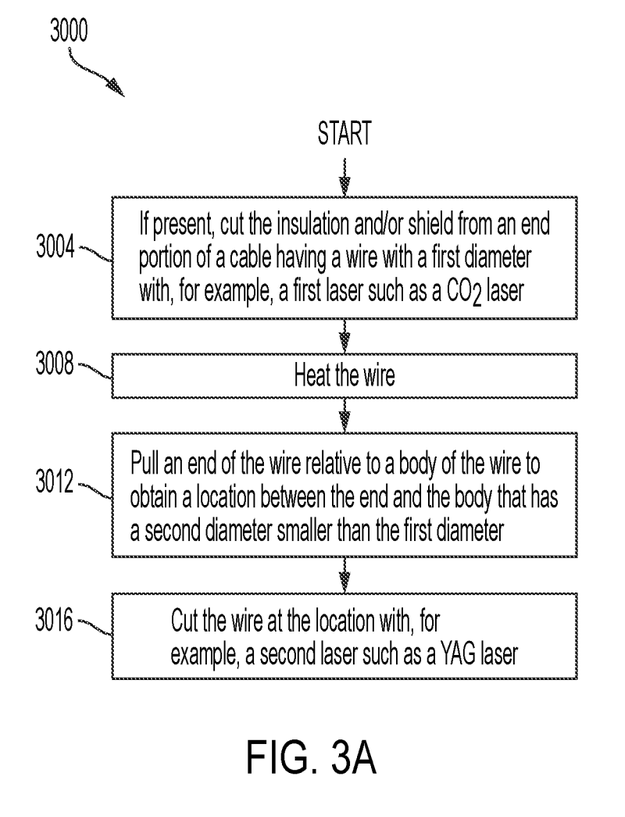
FIG. 3A is flow chart illustrating a method of forming a wire termination portion according to some embodiments of the disclosure.

FIG. 3A illustrates a method 3000 of forming a wire termination portion, such as wire termination portions 1150, 2400*a*, 2400*b*, according to some embodiments of the disclosure. At step 3004, the insulation and/or shield (if present) of an end/termination portion of a cable is cut to such that an internal a wire with a first, for example constant, diameter is exposed at the end portion of the cable. The insulation and/or shield may be cut by a first laser, such as a relatively low intensity laser, such as a $CO_2$ laser, that will not cut through the wire. At step 3008, the wire is heated, for example, at the end/termination portion. Such heat may lower the yield strength and increase the ductility of the heated portion of the wire. Then, at step 3012, which may occur after or simultaneously with step 3008, an end of the wire is pulled relative to a body of the wire (e.g., to stretch the wire between the end and body) to obtain a location between the end and the body having a second diameter smaller than the first diameter. The end of the wire may be pulled relative the body of the wire until the second diameter is substantially smaller than the first diameter, for example, until the second diameter is less than or equal to 75%, 60%, 50%, 40%, 30%, or 20% of the first diameter. Then, at step 3016, the wire may be cut at the location, which location may be the location of smallest diameter of the wire and/or a midpoint of a profile created between the end and the body by heating and pulling the wire. The wire may be cut using a second laser, such as a relatively high intensity laser, such as a YAG (Yttrium, Aluminum, Garnet) laser, including a tightly focused YAG laser beam.

Figure 3B:
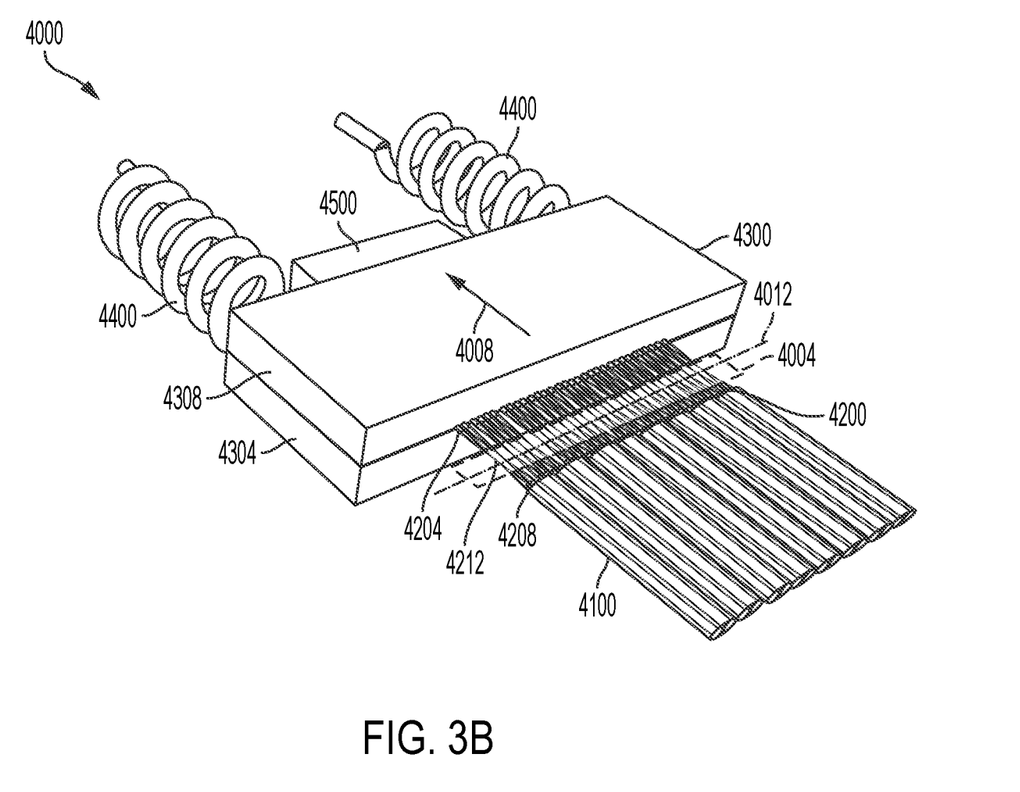
FIG. 3B is a perspective view of an exemplary configuration for performing the method illustrated in FIG. 3A.

FIG. 3B depicts an exemplary configuration 4000 for performing method 3000. In configuration 4000, a series of twin-ax cables 4100, each substantially similar to cable 2000 except with constant diameter wire termination portions, are placed under tension by a clamp and spring apparatus 4300, 4400. Cables 4100 have wires 4200 with ends 4104, which are securely held between two blocks 4304, 4308 of a clamp 4300. Clamp 4300 is pulled in direction 4008 by springs 4400 that are coupled to clamp 4300 while the remainder or body of the wires 4208 are held in place. While under tension, heat 4004 is applied at a part of the termination portion of wires 4200. As this termination portion is heated (e.g., to above 300 degrees Celsius for copper wire), its yield strength is lowered and ductility increased such that the tension provided by the clamp and spring apparatus 4300, 4400 pulls (i.e., draws) ends 4204 away from wire bodies 4208 in direction 4008 to create a tapered profile between ends 4204 and a midpoint location 4212 as well as a tapered profile between ends 4208 and location 4212 (i.e., it creates a profile between ends 4204 and wire bodies 4208). The wires at location 4212 will have a diameter that is less than the diameter of wires at ends 4204 and bodies 4208. Once the desired profile and/or diameter at locations 4212 is achieved, the wires can be cut along line 4012 to produce a cable having a tapered termination portion according to some embodiments of this disclosure (e.g., like cable 2000). A backstop 4500 may be used to prevent the clamp and spring apparatus 4300, 4400 from pulling the ends 4204 too far relative to bodies 4208 such that a uniform tapered profile may be achieved across all tapered cables if method 3000 is repeated using a configuration like configuration 4000.

Figure 4B:
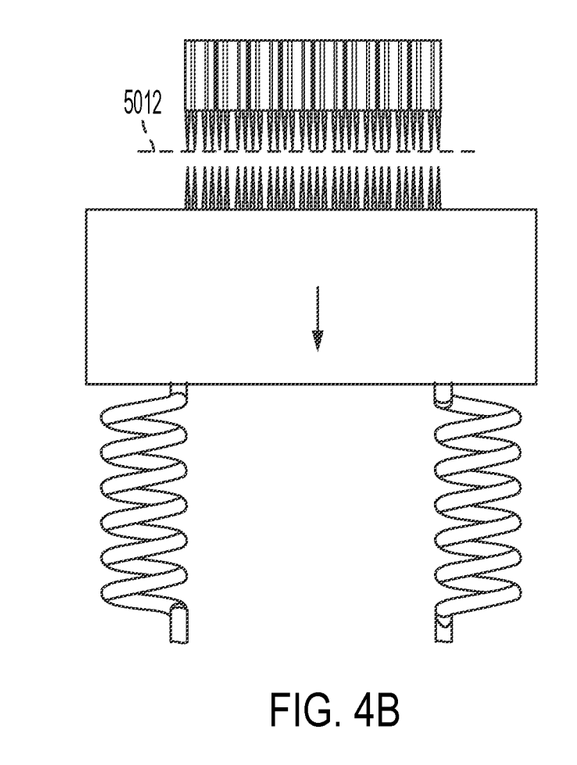

The heating and cutting of method 3000 can be performed in a variety of ways. For example, FIG. 4A depicts the same configuration 4000 for performing method 3000 shown in FIG. 3B where a broadly-focused YAG laser beam 5004 is applied over part of the termination portion of wires 4200 to substantially heat that part. Then, as shown in FIG. 4B, after the desired tapered profile has been achieved, a tightly-focused YAG laser beam 5012 may be used to cut the wires for example at location 4212. The same YAG laser used to create broadly-focused laser beam 5004 may be used (e.g., by adjusting the focus of the laser beam) to create tightly-focused laser beam 5012. For example, a single YAG laser with a fixed power output may be adjusted optically to create the broadly-focused beam 5004 with a relatively low power density (but still sufficiently high to raise the temperature of the wire such that it can be stretched (e.g., above about 400 degrees Celsius for copper wire)) and to create the tightly-focused beam 5012 with a relatively high power density (sufficient for cutting the wire (e.g., above about 1000 degrees Celsius for copper wire)). As another embodiment, a single YAG laser with a variable/modulated power output may be used to create a fixed-focused beam (e.g., the size of tightly-focused YAG laser beam 5012 as shown in FIG. 4B) and the power adjusted to heat and cut the wire (e.g., the power may be adjusted relatively low to heat the wire such that it can be stretched and then the power adjusted relatively high to cut the wire).

Figure 5A:
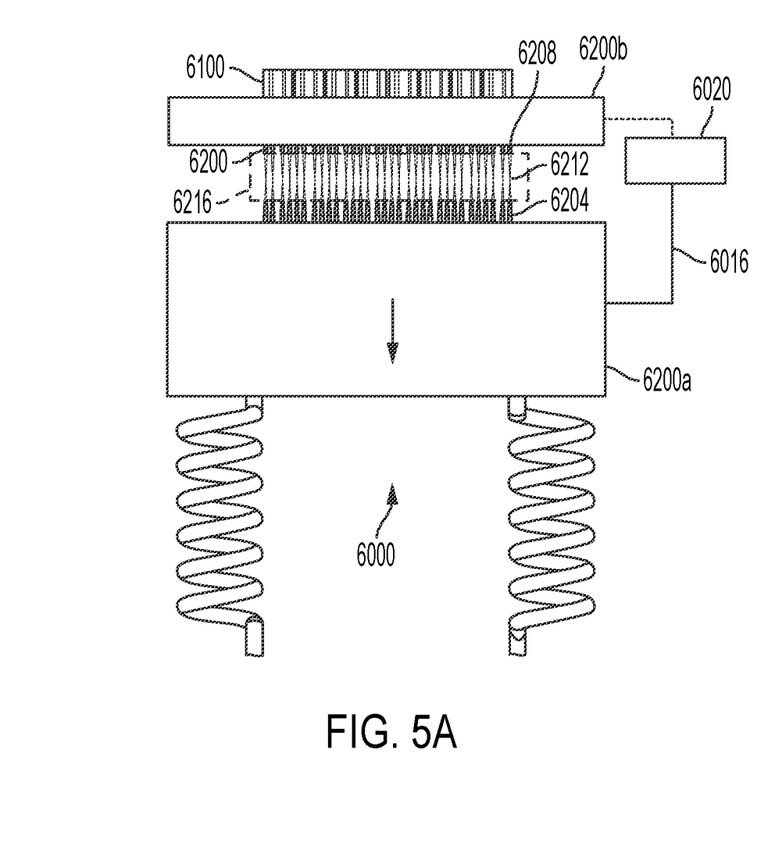
FIGS. 5A and 5B are top perspective views depicting steps of forming a wire termination portion according some embodiments of the method illustrated in FIG. 3A.
Figure 5B:
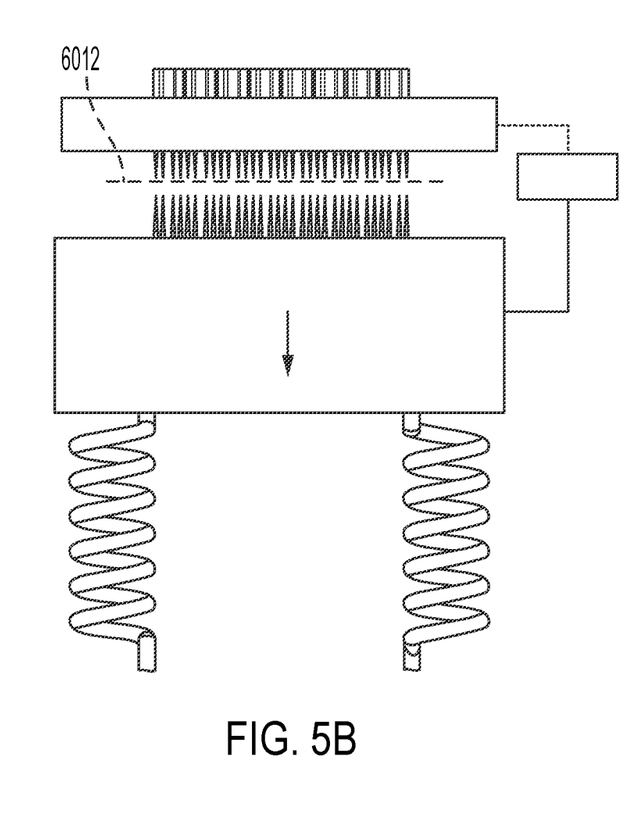

As another example of performing the heating and cutting of method 3000, FIG. 5A depicts a configuration 6000 for performing method 3000 that is substantially the same as configuration 4000 except that it includes first and second clamps 6300*a*, 6300*b*, respectively, a heating wire 6016, and a current source 6020. Clamp 6300*a* is substantially the same as clamp 4300 and configured in the same manner but may also be configured to conduct electricity between heating wire 6016 and ends 6204 of cable wires 6200. Clamp 6300*b* is coupled to wire bodies 6208 of wires 6200 (of cables 6100). Clamp 6300*b* secures wire bodies 6208 to provide tension with ends 6204 secured to clamp 6300*a* and may be configured to conduct electricity between heating wire 6016 and wire bodies 6208. Clamp 6300b may also protect the insulation and shield of cables 6100 from any deterioration or damage caused by heating the transition portion. Heating wire 6016 is used to complete a circuit between clamps 6300a and 6300b and between ends 6204 and bodies 6208 of wires 6200. Current source 6020 provides current to this circuit, which heats (i.e., via Joule heating) part 6216 of the termination portion of wires 6200. Then, as shown in FIG. 5B, after the desired tapered profile has been achieved, the wire can be cut at location 4212, for example, by a tightly-focused YAG laser beam 6012. Current source 6020 may provide direct or alternating current to heat the wires. Higher frequencies produced by AC may be used to concentrate heat in the outer surface of part 6216, producing more even heating so the method of forming a tapered wire termination portion, such as method 3000, proceeds more quickly. This is because, as the wires in part 6216 are stretched, their cross-section (i.e., diameters) decrease faster than their surface area, thereby accelerating the rate of Joule heating. The magnitude, frequency, and duration of current produced by current source 6020 may be adjusted to modify the profile of the taper produced by method 3000.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
    heating a wire, the wire having an end and a body, the body having a first diameter;
    pulling the end relative to the body to obtain a location between the end and the body that has a second diameter smaller than the first diameter; and
    cutting the wire at the location to separate the end from the body.

2. The method of claim 1, further comprising pulling the end relative to the body until the second diameter is less than or equal to 50% of the first diameter.

3. The method of claim 1, further comprising ceasing to pull the end relative to the body when the distance between the end and the body reaches a predetermined distance.

4. The method of claim 1, further comprising heating the wire with a broadly-focused YAG laser.

5. The method of claim 1, further comprising cutting the wire with a tightly-focused YAG laser.

6. The method of claim 1, further comprising heating and cutting the wire with a YAG laser.

7. The method of claim 1, further comprising cutting insulation from the wire to expose the end of the wire using a first laser and cutting the wire at the location using a second laser.

8. The method of claim 1, further comprising pulling the end relative to the body with a clamp coupled under tension to at least the end.

9. The method of claim 8, further comprising pulling the end relative to the body with the clamp while the wire is heated.

10. The method of claim 1, further comprising heating the wire with electrical current prior to or while pulling the end relative to the body.

11. The method of claim 10, wherein the electrical current is alternating current.

* * * * *